United States Patent [19]

Broce et al.

[11] 4,003,060

[45] Jan. 11, 1977

[54] DIRECTION FINDING RECEIVER

[75] Inventors: Fred L. Broce, Doraville; William F. Bentley, Jr., Smyrna; William L. Kilpatrick, Austell, all of Ga.

[73] Assignee: United States Government as represented by FCC, Washington, D.C.

[22] Filed: Feb. 26, 1975

[21] Appl. No.: 553,313

[52] U.S. Cl. .................... 343/113 PT; 343/115; 325/451

[51] Int. Cl.² .................... G01S 5/02

[58] Field of Search ............. 343/113 PT, 115; 325/451

[56] References Cited

UNITED STATES PATENTS

| 3,115,635 | 12/1963 | Leeming, Jr. et al. | 343/113 PT |
| 3,323,129 | 5/1967 | Held | 343/113 PT |

OTHER PUBLICATIONS

Bendix Navigator 410 Circuit Details, Nova-Tech Inc., Manhattan Beach, Calif., 5-28-63.

Guidebook of Electronic Ckts., J. Markus, McGraw-Hill, 1974, p. 697.

Primary Examiner—Maynard R. Wilbur
Assistant Examiner—T. M. Blum
Attorney, Agent, or Firm—Joseph A. Hill; Parshotam S. Lall

[57] ABSTRACT

A direction finding receiver contained in a hand held portable housing with a ferrite rod antenna mounted in and protruding through the housing so that when the antenna axis points to the radio frequency signal source to be direction found, a null is obtained in the signal level. The antenna is coupled to the receiver circuit which comprises a broadband fixed tuned radio frequency amplifier having low sensitivity, a modulation oscillator used to modulate the broadband fixed tuned rf amplifier by tone injection when a steady carrier is present, a demodulator for demodulating the rf signal, and an audio amplifier for amplifying the demodulated signal.

8 Claims, 2 Drawing Figures

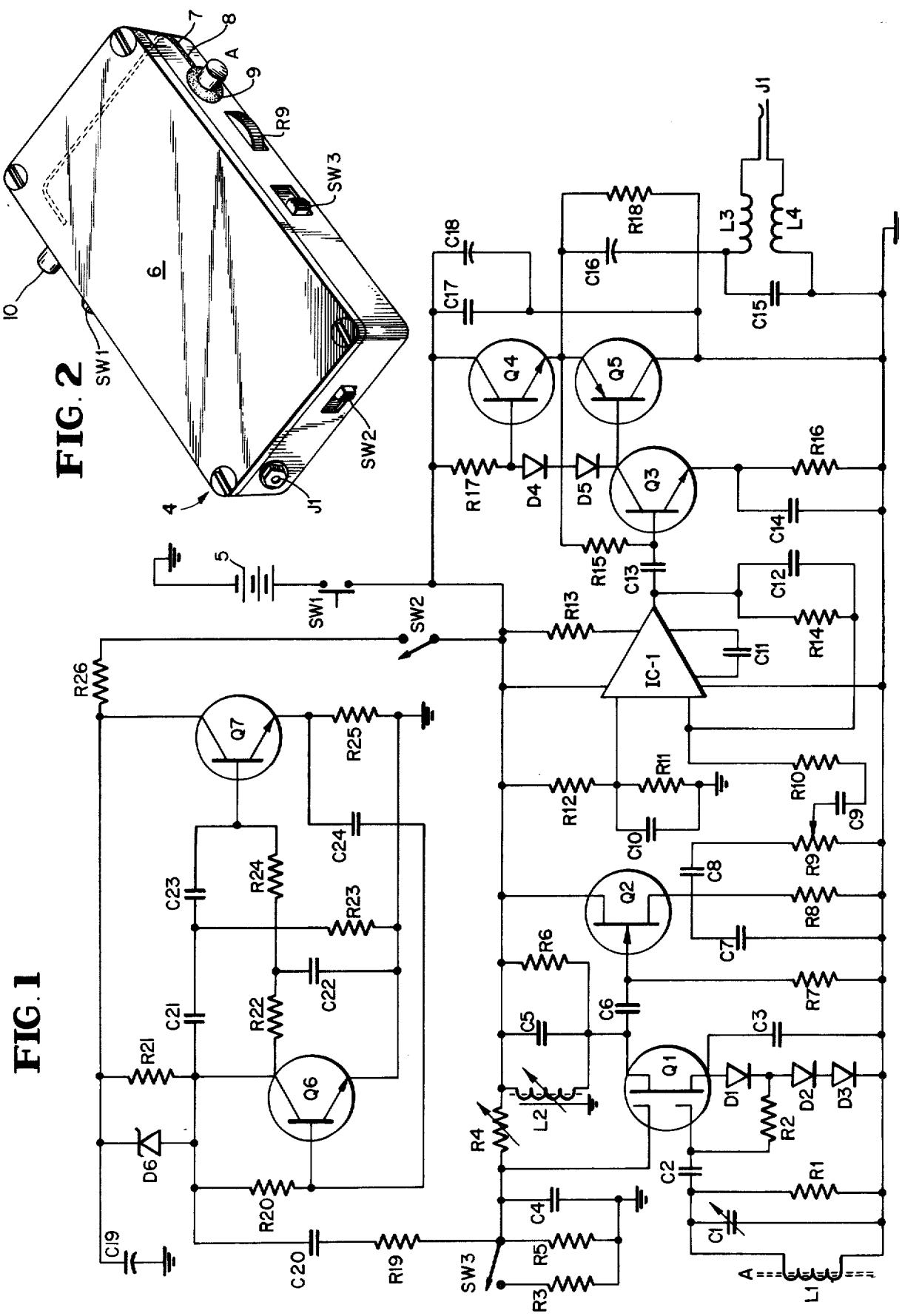

DIRECTION FINDING RECEIVER

BACKGROUND OF THE INVENTION

Field of the Invention

The present invention relates to a direction finding receiver contained in a hand held portable housing with a ferrite rod antenna for direction finding an rf signal source.

Description of the Prior Art

In the field of direction finding receivers, it has been the general practice in the art to employ a ferrite rod antenna to direction-find the rf signal source by rotating the ferrite rod antenna until a null is obtained in the signal level. Such receivers have been unsatisfactory in the past in that the receivers are not hand held portable units. Further, it has been necessary to know the exact rf signal frequency so that the receiver can be tuned to the rf signal source frequency before the signal source can be direction found. Also, the rf amplifiers in the receivers are highly sensitive not permitting direction finding of nearby rf signal sources. Therefore, when a signal source is to be direction found, it is necessary to use a bulky receiver which has to be tuned to the exact rf signal source frequency before the ferrite rod can be rotated to find a null in the signal level. Further, if the rf signal source frequency is not known or falls outside of the receiver bandspread, then it is not possible to direction find the rf signal source. If the signal source is nearby, the rf amplifier is usually overloaded by the rf signal source. U.S. Pat. No. 3,323,129 issued to Held discloses a receiver with a ferrite rod antenna that pivots on top of the receiver cabinet. To direction find an rf signal source, it is first necessary to know the rf signal frequency so that the receiver can be tuned to that frequency. The antenna is then rotated to find the null. In FIG. 3, the ferrite rod antenna pivots, and when a null is obtained in the signal level, the axis of the ferrite antenna rod indicates the direction of the rf signal source to be direction found. U.S. Pat. No. 3,683,384 issued to Warren discloses a hand held portable directional receiver which utilizes fixed single frequency rf modules which are precisely tuned to the signal frequency of the radio beacon to be direction found.

SUMMARY OF THE INVENTION

The general purpose of this invention is to provide a direction finding receiver contained in a hand held portable housing for radio direction finding nearby rf signal sources having all the advantages of similarly employed prior art direction finding receivers and none of the disadvantages. To attain this, the present direction finding receiver makes it unnecessary to know the frequency of the rf signal source to be direction found. The device is further relatively insensitive, broadband not necessitating the use of a tuning capacitor in the rf amplifier. An object of the present invention is the provision of a direction finding receiver with a broadband fixed tuned rf amplifier which is a Dual Gate Protected MOS Field Effect Transistor operating in a tuned-input tuned-output grounded source configuration. Another object is that the rf amplifier may be tuned to the center frequency of 27.1 MHz with a 3db rolloff occurring 0.3 MHz each side of the center frequency (26.8 MHz and 27.4 MHz.) Therefore, the receiver bandspread is across the frequencies assigned to the Citizens Radio Service by the Federal Communications Commission. An additional object of the invention is a direction finding receiver having a broadband fixed tuned rf amplifier with low sensitivity which operates over a short distance to direction find nearby rf signal sources in the immediate area. The low sensitivity of the receiver may range up to 50 mV/m at center frequency with high sensitivity of the receiver ranging up to 10 mV/m. A further object of the invention is that the rf signal which is received by the ferrite rod antenna that is coupled to the broadband fixed tuned rf amplifier is demodulated by an N Channel FET detector and fed to an audio amplifier which is a low current operational amplifier followed by a low current power output stage. Still another object is to provide a Twin T feedback 1 kHz oscillator that modulates the broadband fixed tuned rf amplifier when an unmodulated steady carrier is being direction found. A still further object is by pointing the ferrite rod antenna at the rf signal source, a null in the signal level is obtained when the axis of the antenna points at the rf signal source. It is an object of the invention that by using a broadband fixed tuned rf amplifier, the same result of direction finding an rf signal source can be obtained with fewer components than the number of components in the prior art devices. No adverse effects are produced in using fewer components in the new and novel disclosed invention over the prior art.

BRIEF DESCRIPTION OF THE DRAWINGS

With these and other objects in view, as will hereinafter more fully appear, and which will be more particularly pointed out in the appended claims, reference is now made to the following description taken in connection with the accompanying drawings in which FIG. 1 is the circuit diagram of the invention; and FIG. 2 is a top perspective view of the invention.

DETAILED DESCRIPTION OF THE INVENTION

In FIG. 1, the broadband fixed tuned rf amplifier consists of a Dual Gate Protected MOS Field Effect Transistor Q1 operating in a tuned-input tuned-output grounded source configuration. An rf signal is received by the ferrite rod antenna A. Inductor L1, wound around the ferrite antenna rod A, in parallel with variable capacitor C1 comprises the tuned-input circuit. A loading resistor R1 is shunted across the tuned circuit to keep the Q low and the tuned-input circuit frequency response broadband. Coupling capacitor C2 couples the tuned-input circuit to the first gate of Q1. A series string of diodes D1, D2, and D3 connected to the source of Q1 are used for biasing. Biasing resistor R2 is connected between the first gate of Q1, and between the junction of biasing diodes D1 and D2. Bypass capacitor C3 is connected between the source of Q1 and ground. The tuned-output circuit comprises tuned variable inductor L2 and capacitor C5 connected to the drain of Q1 and the direct current (dc) power supply 5. A loading resistor R6 is shunted across the tuned-output circuit to keep the Q low and the tuned-output circuit frequency response broadband. A press button on-off switch SW1 controls the dc power supply 5. A resistor R4 is connected between the dc supply 5 and the second gate of Q1 for controlling the gain of Q1. A bypass capacitor C4 is connected from the second gate of Q1 to ground. Resistor R5 is connected from the second gate of Q1 to ground and controls the sensitivity of Q1. A switch SW3 can connect resistor R3 in parallel with resistor R5 to lower the sensitivity of Q1 by changing its transconductance as the bias is changed. The demodulator for the rf amplifier utilizes an N Channel Field Effect Transistor Q2 operated as a sensitive detector with a wide dynamic range. Coupling capacitor C6 is connected between the drain of Q1 and the gate of Q2. Biasing resistor R7 is connected between the gate and ground of Q2 to set the biasing. The drain of Q2 is connected to the dc supply 5. Bypass capacitor C7 is connected between the source of Q2 and ground. Resistor R8 is connected between the source of Q2 and ground to control the leakage current. The audio amplifier uses a low current operational amplifier (op-amp) IC-1 followed by a low current power output stage intended to drive an earphone. Coupling capacitor C8 connects the source of Q2 to one side of variable resistor R9, the audio gain (volume) control. The other side of R9 is connected to ground while the slider of R9 is connected to the coupling capacitor C9. A gain setting resistor R10 is connected between the other side of capacitor C9 and the inverting input of the op-amp IC-1. A feedback loop having feedback resistor R14 and feedback capacitor C12 in parallel is connected between the inverting input and the output of the op-amp IC-1. A frequency compensation capacitor C11 is connected to the op-amp IC-1. The op-amp IC-1 is connected to the dc supply 5. Bias resistors R12 and R11 are connected in series between the dc supply 5 and ground respectively. A bypass capacitor C10 is connected in parallel across bypass resistor R11. The junction of bypass resistors R11 and R12 is connected to the noninverting input of the op-amp IC-1. Resistor R13, connected between the dc supply 5 and the op-amp IC-1, is for internal biasing. The output of the op-amp IC-1 is coupled through coupling capacitor C13 to the base of the NPN audio driver transistor used for gain and impedance matching of the op-amp IC-1 to transistors NPN Q4 and PNP Q5 which form a complimentary pair power output stage. Emitter capacitor C14 and emitter resistor R16 are connected from the emitter of Q3 to ground. Biasing and feedback resistor R15 is connected from the base of Q3 to the common emitter junction of Q4 – Q5. The collector of Q3 is connected to the base of Q5. The collector of Q5 is connected to ground. From the base of Q4 to the junction of the collector of Q3 and the base of Q5 are two diodes D4 and D5 in series which control the bias on the Class B output stage. The cathode of D5 is connected to the junction of the collector of Q3 and base of Q5 while the anode of D4 is connected to the base of Q4. The collector of Q4 is connected to the dc supply 5. Between the base and collector of Q4 is collector resistor R17 which controls the gain of Q4. Filter capacitors C17 and C18 are between the collector of Q4 and ground for filtering and bypassing the dc supply 5. Between the common emitter junction of Q4 is resistor R18 connected to ground which is used for loading of the output of the amplifier. From the common emitter junction of Q4 – Q5, bypass capacitor C16 and inductor L3 are connected in series to the inner connector of the earphone output jack. Between capacitor C16 and inductor L3 is bypass capacitor C15 which is connected to ground. Inductor L4 is connected from the outer earphone jack connected to ground. A Twin T feedback oscillator at a frequency of about 1 kHz is used for modulating the rf amplifier when a steady signal is received. A resistor R26 is connected to the dc supply 5 through switch SW2 which is used to turn the oscillator on and off for tone injection into the rf amplifier. Capacitor C19 which forms a filter with resistor R26 is connected to the other side of resistor R26 and ground. The collector of a low current silicon NPN transistor Q7 is connected between resistor R26 and capacitor C19. An emitter follower resistor R25 is connected between the emitter of Q7 and ground. Between the emitter of Q7 and the base of low current silicon NPN transistor Q6 is coupling capacitor C24. Between the collector of Q6 and the base of Q7 are resistors R22 and R24. A capacitor C22 is connected between the junction of R22 and R24 to ground. From the collector of Q6 to the base of Q7 are two capacitors C21 and C23. A resistor R23 is connected between the junction of C21 and C23 to ground. Capacitors C21 – C23 and resistors R21 – R23 determine the oscillation frequency of the Twin T feedback oscillator besides acting as a low pass filter. A collector resistor R21 is connected between resistor R26 and capacitor C19 to the collector of Q6. A zener diode D6 is connected across collector resistor R21 to regulate the output amplitude of the oscillator. A bias resistor R20 is connected between the base and collector of Q6. Between the second gate of Q1 and the collector Q6 are connected a signal level limiting resistor R19 which sets the gain and a coupling capacitor C20 respectively.

In FIG. 2, the directional receiver 4 is contained in a rectangular metal housing 6. The ferrite rod antenna A protrudes through and extends outward from the metal housing and on each opposite side parallel to the width axis of the rectangular housing. Below the antenna is variable resistor R9 used as the audio gain (volume) control and SPST switch SW3 for reducing the sensitivity of the direction receiver from a high sensitivity position to a low sensitivity position by connecting resistor R3 in parallel with resistor R5. SPST switch SW2 on the bottom of the housing turns the modulation oscillator on and off for injecting a tone into the second gate of Q1. The earphone is connected to earphone jack J1. The direction finding receiver is turned on and off through the press switch SW1 which connects the dc power supply 5 to the direction finding receiver. From the top of the metal housing to the ferrite rod antenna and along the center line of the depth axis is a thin slot 7 that has been cut into the metal case. The slot 7 may be filled with any suitable insulating filler 8 such as silicon rubber so as to keep moisture and dust out of the interior of housing 6. The slot is cut into the metal case as the metal case would electrically represent a shorted turn to the ferrite antenna rod. The ferrite antenna rod uses the magnetic component of the received electromagnetic field while the metal case acts as a Farraday Shield shielding the electrostatic field. It is necessary to cut the slot into a portion of the metal housing so that the electromagnetic field will not be short circuited. Rubber grommets 9 and 10 shock mount the ferrite antenna rod A from the rectangular metal housing 6.

MODE OF OPERATION OF INVENTION

With the direction finding receiver held in the right hand, the index finger engages the press button on-off switch SW1 to connect the dc power supply 5 to the receiver thereby energizing the receiver. An earphone is connected to the earphone output jack J1. The earphone cord has been filtered by an LC circuit to prevent rf pickup as the cord acts as an antenna and would influence bearing accuracy. This placement of the unit in the right hand places the audio gain (volume) control thumbwheel of variable resistor R9 under the right thumb. To increase the audio gain (volume), the thumbwheel of variable resistor R9 is pushed up toward the edge of the case. To internally modulate the rf amplifier if a steady unmodulated signal is being received, the SPST slide switch SW2 is moved toward the earphone output jack J1. This energizes the tone oscillator and injects a 1 kHz tone into the second gate of rf amplifier Q1 to internally modulate the received signal. When the direction finding receiver is in the approximate area of a signal to be direction found that is received with the audio gain control turned midway in its range, the receiver is rotated by the user's hand to obtain a null in the signal level. A bearing indicating the direction of the antenna is obtained by sighting along the top edge of the receiver. If the signal is so strong that the null is not definite in signal level, then SPST slide switch SW3 below the audio gain control is moved down to a low sensitivity position thereby paralleling resistor R3 with resistor R5 thereby reducing the gain of Q1 by 13db. In the area of a very strong signal with switch SW3 in the low sensitivity position, the null that is obtained is more sharp and definite. The distance to the rf signal source to be direction found and the sensitivity varies directly with the effective radiated power. Generally, the high sensitivity position is used for direction finding an rf signal from a distance of a couple of city blocks while the low sensitivity position is used when the rf signal source is very nearby or the effective radiated power is quite large. Of course, any of these parameters such as distance of the rf signal source, effective radiated power, electromagnetic wave propagation, etc., may vary. Therefore, the sensitivity position used relates these parameters and the sharpness of the null desired.

The receiver provides directional information through the pick-up figure eight pattern of the ferrite rod antenna. This pattern is a typical rod pattern oriented to give a null when the longitudinal axis of the ferrite rod is pointed both in azimuth and elevation toward a vertically polarized transmitting antenna. If the source is horizontally polarized and produces only a horizontally polarized signal, ambiguous results will be obtained but normally, there is enough vertical radiation or reradiation from the coax or tower so that the station may be direction found. By taking two or more bearings, the rf signal source can be direction found by triangulating the bearings to a fixed point.

Obviously many modifications and variations of the present invention are possible in light of the above teachings. By changing the composition of the ferrite antenna rod A, the tuned-input parameters of L1-C1, and the tuned-output parameters of L2-C5, the center frequency along with the 3db roll-off bandspread can be set to any desired frequency and frequency range respectively. These frequency ranges could include the aircraft band, land mobile bands, business bands, etc. It is therefore to be understood that within the scope of the appended claims, the invention may be practiced otherwise than as specifically described.

What is claimed and desired to be secured by Letters Patent of the United States is:

1. In a hand held portable direction finding receiver contained in a metal rectangular housing having an affixed ferrite rod antenna in said housing coupled to receiving circuitry, the improvement in said receiving circuitry comprising a fixed and predesigned frequency tuned-input means and identically tuned-output means connected to a first dual gate protected MOS FET radio frequency amplifier having capability of operating at preselected rolloff points yielding a frequency bandwidth of at least 2% about said pre-designed frequency of said tuned-input, tuned-output means allowing simultaneous operation on more than one radio communication channel with no frequency tuning adjustments, said tuned-input means being connected to a first gate of said first FET, said tuned-output means connected to a drain of said first FET, and means for internally modulating a received signal connected to a second gate of said first FET.

2. The apparatus of claim 1 wherein said means comprises a Twin T feedback oscillator and said oscillator having an output connected to said second gate of said first FET.

3. The apparatus of claim 2 wherein the improvement further comprises an N Channel second FET capacitively coupled to the output of said first FET to demodulate a signal from said first FET and audio rectification means for rectifying said demodulated signal.

4. The apparatus of claim 3 wherein audio rectification means comprises an operational amplifier driving a pair of low current silicon NPN-PNP transistors in a complimentary pair power output stage.

5. The apparatus of claim 4 wherein the improvement further comprises a gain and impedance matching low current silicon NPN transistor coupled between said operational amplifier and said pair of NPN-PNP transistors.

6. The apparatus of claim 1 wherein the improvement further comprises an N Channel second FET capacitively coupled to the output of said first FET to demodulate a signal from said first FET and audio rectification means for rectifying said demodulated signal.

7. The apparatus of claim 6 wherein audio rectification means comprises an operational amplifier driving a pair of low current silicon NPN-PNP transistors in a complimentary pair power output stage.

8. The apparatus of claim 7 wherein the improvement further comprises a gain and impedance matching low current silicon NPN transistor coupled between said operational amplifier and said pair of NPN-PNP transistors.

* * * * *